United States Patent [19]

Ukada

[11] Patent Number: 5,613,595
[45] Date of Patent: Mar. 25, 1997

[54] AUTOMATIC SLOPE FRUIT FEEDING MACHINE USED WITH A FRUIT GRADING MACHINE

[75] Inventor: Masahiro Ukada, Chiriyu, Japan

[73] Assignees: See-Chang Ting, Taipei, Taiwan; Shigeo Nakata, Toyokawa, Japan

[21] Appl. No.: 424,643

[22] Filed: Apr. 19, 1995

[51] Int. Cl.[6] ............................................. B65G 25/00
[52] U.S. Cl. .................................. 198/774.3; 198/775
[58] Field of Search ........................... 198/774.3, 774.4, 198/774.1, 772, 750.8, 773, 750.1, 775, 776; 414/746.1, 746.2, 394.1

[56] References Cited

U.S. PATENT DOCUMENTS

| 1,028,411 | 6/1912 | Wieghard et al. | 198/776 X |
|---|---|---|---|
| 1,725,112 | 8/1929 | Terao | 198/776 X |
| 3,319,762 | 5/1967 | Rose | 198/776 X |
| 3,412,859 | 11/1968 | Thornton | 198/775 X |
| 3,547,249 | 12/1970 | Aguilar et al. | 198/774.3 |
| 4,853,116 | 8/1989 | Wallander | 198/776 |
| 5,086,912 | 2/1992 | Howden, Jr. | 198/774.3 X |

FOREIGN PATENT DOCUMENTS

| 1026686 | 3/1958 | Germany | 198/774.3 |
|---|---|---|---|
| 2086335 | 8/1982 | United Kingdom | 198/774.3 |

*Primary Examiner*—Frank E. Werner
*Attorney, Agent, or Firm*—Bacon & Thomas

[57] ABSTRACT

This invention relates to an automatic fruit feeding machine mainly including a fixed carrier assemblage and a movable carrier assemblage which is driven by a driving device to continuously move upward and forward relative to the fixed carrier assemblage, so that fruit held thereon are transferred from a lower or back position to a higher or front position on the fixed carrier assemblage step by step until the fruit are fed one by one into a hopper of an associated fruit grading machine mounted below the fruit feeding machine.

1 Claim, 9 Drawing Sheets

AUTOMATIC SLOPE FRUIT FEEDING MACHINE USED WITH A FRUIT GRADING MACHINE

BACKGROUND OF THE INVENTION

1. Field of the Invention

The present invention relates to an automatic slope fruit feeding machine used with a fruit grading machine, of which the structure is simple and by which fruit to be sorted and graded can be automatically fed one by one from a slope (or other equivalent manner) to the fruit grading machine.

2. Description of the Prior Art

Most of the conventional automatic fruit weighing and grading machines are operated in cooperation with an automatic fruit feeding machine equipped with fixedly spaced hoppers for carrying and conveying fruit to be graded. Most of such automatic fruit feeding machines use a V-belt or rotor conveyer and therefore have a considerably complicated structure.

SUMMARY OF THE INVENTION

It is therefore a primary object of the present invention to provide an automatic slope fruit feeding machine to eliminate the disadvantage existed in the conventional fruit feeding machines.

The fruit feeding machine according to the present invention is characterized in an inclinedly mounted fixed carrier assemblage consisting of several parallelly connected fixed carrier members and an inclinedly mounted movable carrier assemblage consisting of several movable carrier members respectively disposed between every two of the fixed carrier members. The fixed and the movable carrier assemblages together produce horizontal and vertical movements in a continuous manner to transfer the fruit to be graded.

When the movable carrier assemblage moves upward vertically to project from a top of the fixed carrier assemblage, the fruit which is originally carried by one of the holding recesses formed on the fixed carrier assemblage is raised by the movable carrier assemblage. When the movable carrier assemblage moves downward vertically to be lower than the top of the fixed carrier assemblage, the fruit retained in the recess of the movable carrier assemblage is transferred to the next recess of the fixed carrier assemblage. By means of the continuous upward and downward movements of the movable carrier assemblage relative to the fixed carrier assemblage, the fruit to be graded is automatically transferred one by one and step by step from a lower end to an upper end of the slope feeding machine and finally be fed into the fruit grading machine generally disposed behind the slope fruit feeding machine.

Since the automatic slope fruit feeding machine of the present invention conveys and feeds the fruit to be graded one by one to the fruit grading machine while it puts the fruit in serial order, it can be used as a counter to accurately count the numbers of fruit having been fed and graded.

The automatic slope fruit feeding machine may also be changed to have horizontally extended fixed and movable carrier assemblages. With a driving means, the movable carrier assemblage may be driven to ascend, translate, lower, and translate again in a circular motion so that the fruit carried on the recesses of the movable carrier assemblage can be transferred one by one to the next recesses on the fixed carrier assemblage.

DETAILED DESCRIPTION OF THE PREFERRED EMBODIMENTS

Figure 1:
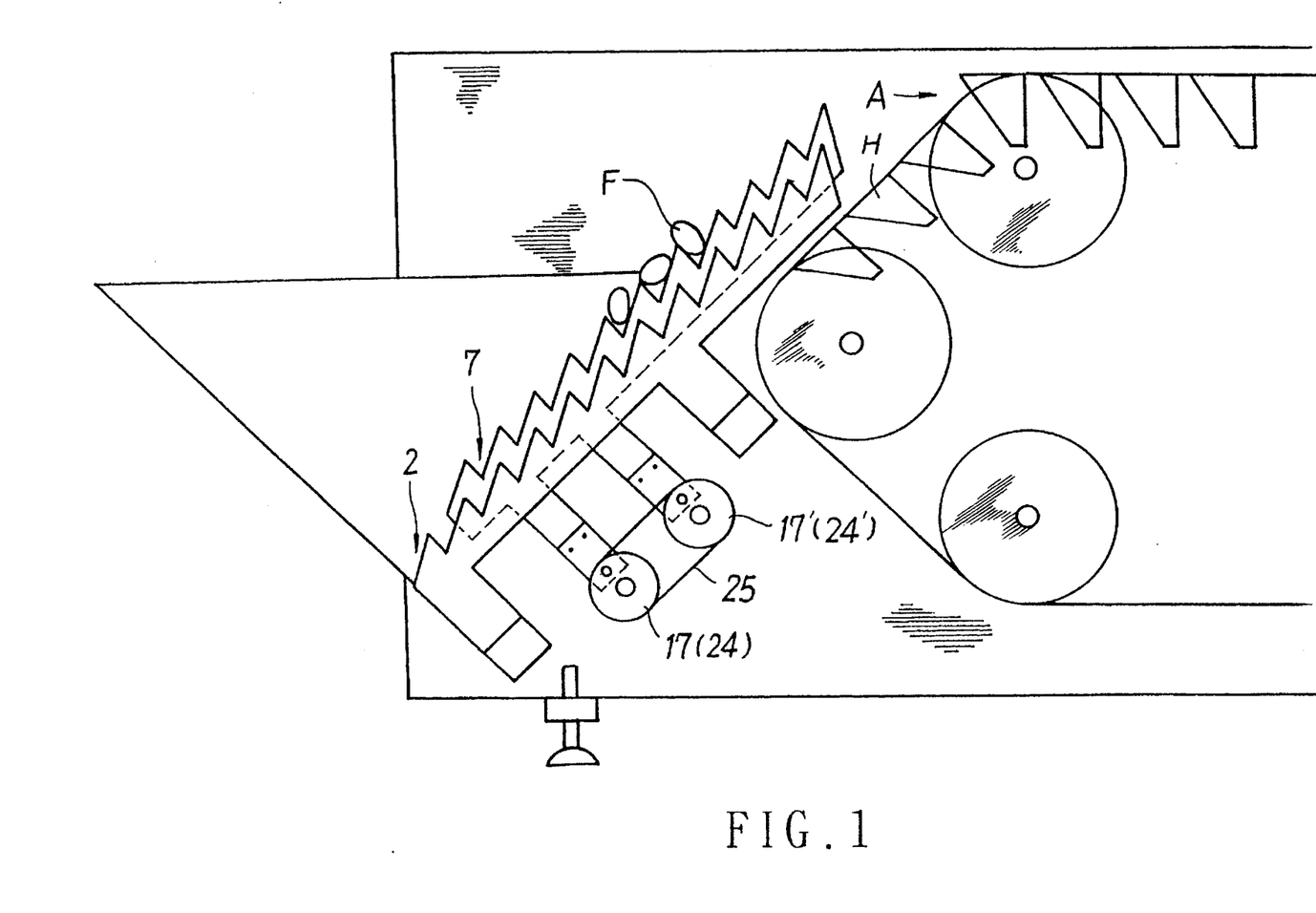
FIG. 1 is a schematic side view showing an automatic slope fruit feeding machine according to the present invention being disposed near a beginning point of a fruit grading machine.

Please refer to FIG. 1 in which an automatic slope fruit feeding machine 1 according to the present invention is inclinedly mounted near a beginning point of a fruit grading machine A, such that fruit F being carried and conveyed by the fruit feeding machine are automatically fed one by one into hoppers H of the fruit grading machine.

Figure 3:
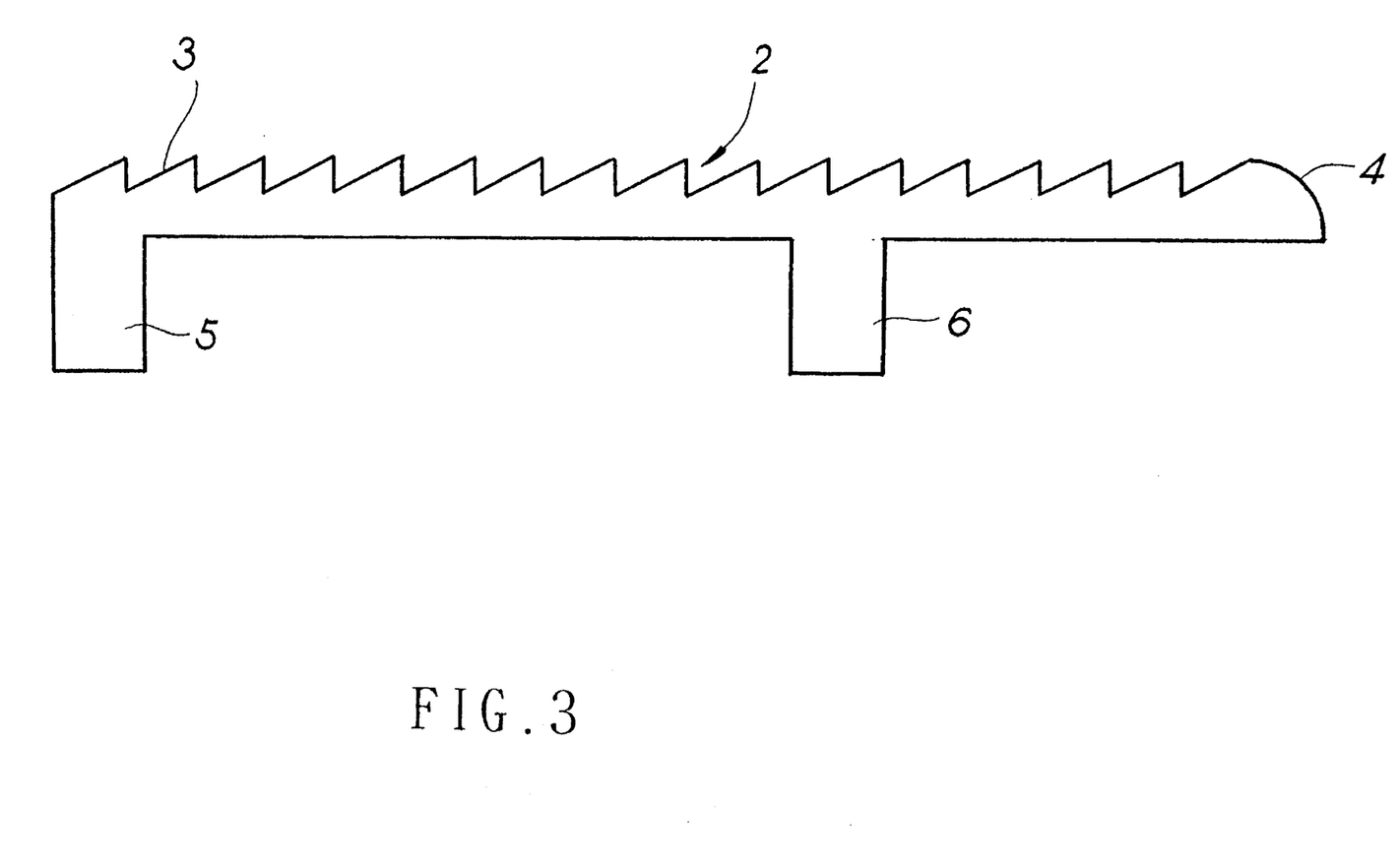
FIG. 3 is a side view showing a fixed carrier member of the automatic slope fruit feeding machine of the present invention.
Figure 4:
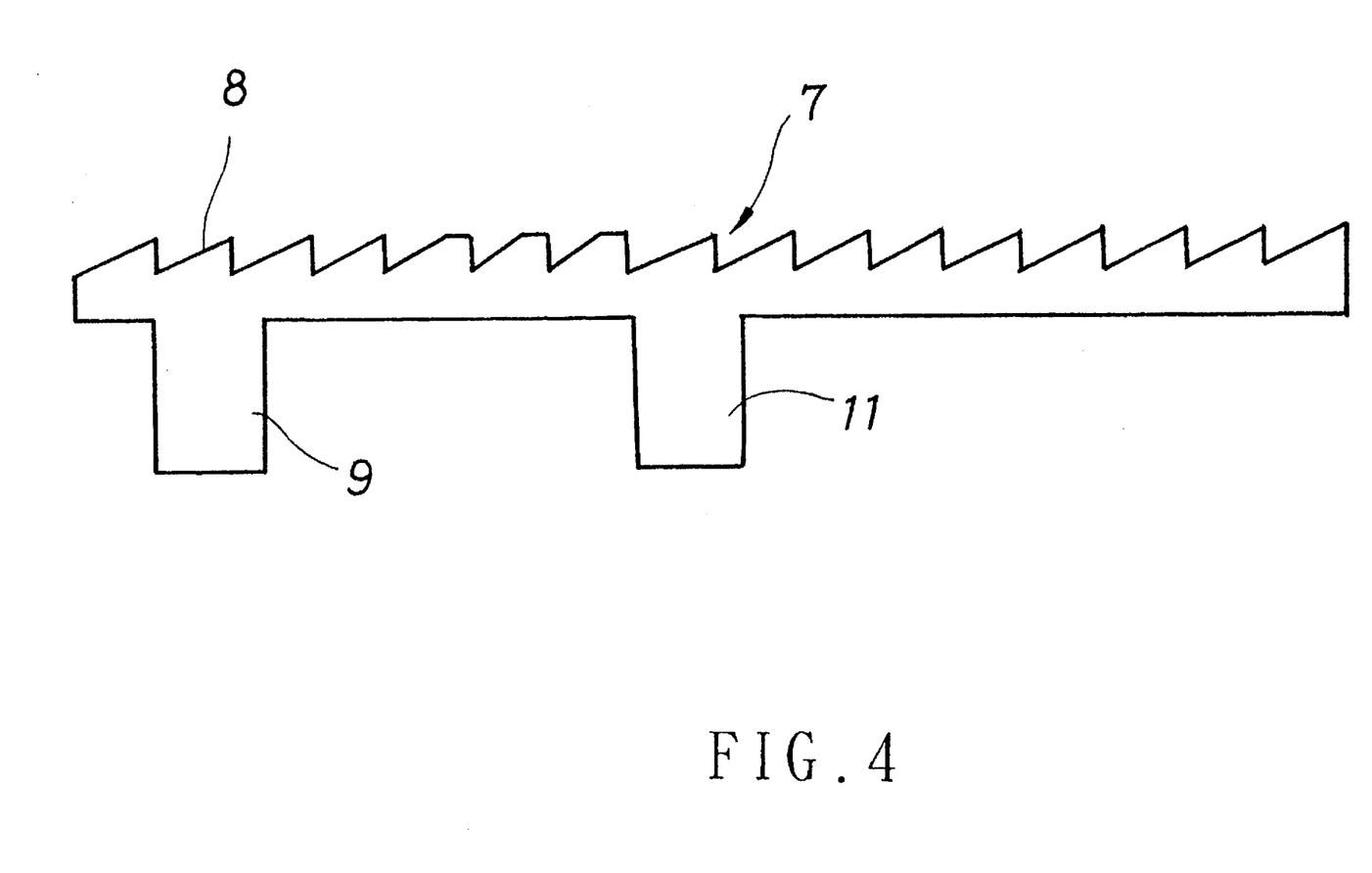
FIG. 4 is a side view showing a movable carrier member of the automatic slope fruit feeding machine of the present invention.

Please refer to FIGS. 3 and 4. The automatic slope fruit feeding machine 1 mainly includes a fixed carrier assemblage K consisting of a plurality of longitudinally extended fixed carrier members 2 and a movable carrier assemblage M consisting of a plurality of longitudinally extended movable carrier members 7 being respectively disposed between every two of the fixed carrier members 2.

The fixed carrier members 2 each is a perpendicularly erected long plate having a predetermined height and length. A top portion of the long fixed carrier member 2 is formed with a plurality of continuous teeth such that a holding recess 3 is formed between every two of the teeth. The holding recess 3 each has a height and an axial space large enough to carry a piece of fruit F therein. A final tooth of the fixed carrier member 2 disposed at an upper or a second end thereof has a downward and outward curved surface 4. The fixed carrier member 2 each is provided near a lower or a first bottom end with a generally rectangular beginning mounting plate 5 extending downward therefrom, and near a middle bottom portion close to an upper or a second bottom end thereof with a similarly shaped end mounting plate 6.

The movable carrier members 7 each has a configuration and a erection manner similar to that of the fixed carrier member 2 but is slightly shorter than the fixed carrier member 2. A plurality of teeth and accordingly a plurality of holding recesses 8 are also formed on a top portion of each movable member 7 corresponding to those holding recesses 3 of the fixed carrier member 2. The movable carrier member 7 each is provided below the second tooth thereof with a downward extended rectangular beginning mounting plate 9 and below the middle tooth thereof with another similarly shaped end mounting plate 11.

Please now refer back to FIG. 2. The beginning mounting plates 5 and the end mounting plates 6 of the fixed carrier members 2 are respectively fixedly attached to a first and a second supporting members 13 of the fruit grading machine A between two side walls 12 thereof. The first and the second supporting members 13 have substantially the same width as that of the mounting plates 5 and 6, allowing the fixed carrier members 2 (there are three fixed carrier members 2 in this embodiment) to be aligned with and mounted on the supporting members 13 of the fruit grading machine A. Pads 14 slightly thicker than the movable carrier member 7 are separately inserted between every two of the beginning mounting plates 5 and of the end mounting plates 6 of the fixed carrier members 2, and then, bolts 15 are used to separately tightly fasten the mounting plates 5 and the mounting plates 6 by threading the bolts 15 through two pairs of projected plates 13a separately provided on the first and the second supporting members 13, the aligned mounting plates 5 and 6, and the pads 14 inserted between every two of the mounting plates 5, 6, so that the fixed carrier members 2 are bound together to form the fixed carrier assemblage K.

Figure 5:
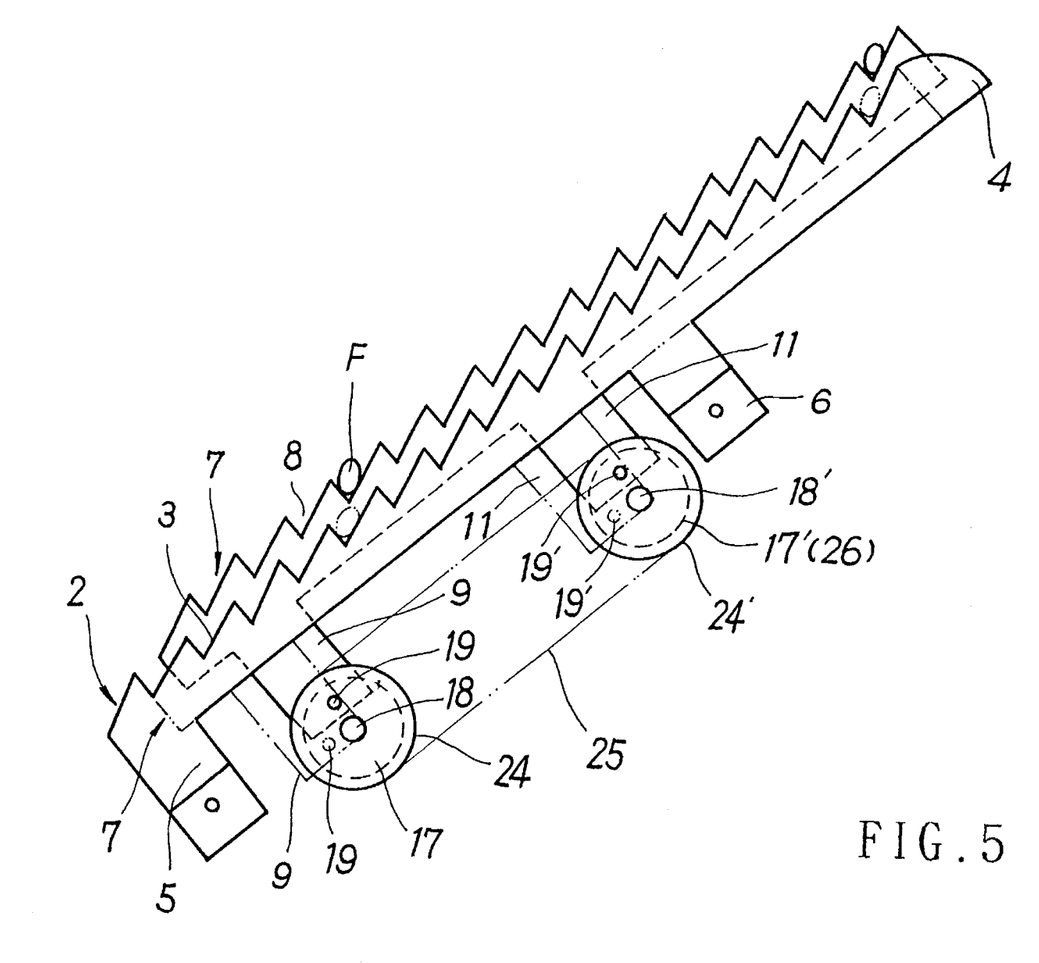
FIG. 5 is a side view showing the movable carrier assemblage of the present invention is driven by cranked round plates to raise so as to carry a fruit thereon to a higher position on the feeding machine.

The movable carrier members 7 (there are two movable carrier members 7 in this embodiment) are separately inserted between every two of the fixed carrier members 2 with the beginning mounting plates 9 thereof in alignment with the second holding recesses 3 of the fixed carrier members 2, as shown in FIG. 5 by the broken line.

Two first cranked round plates 17 are symmetrically mounted at two lateral sides of the fixed carrier assemblage K near the lower or first end thereof and each has a first supporting shaft 18 mounted at a center thereof. A first eccentric shaft 19 extends between and interconnects the two first cranked round plates 17 while it extends through and interconnects the beginning mounting plates 9 of the movable carrier members 7 at the same time.

In a similar manner, two second cranked round plates 17' are symmetrically mounted at two lateral sides of the fixed carrier assemblage K near the upper or second end thereof and each has a second supporting shaft 18' mounted at a center thereof. A second eccentric shaft 19' extends between and interconnects the two second cranked round plates 17' while it extends through and interconnects the end mounting plates 11 of the movable carrier members 7 at the same time. With this arrangement, the two movable carrier members 7 are inserted between and associated with the fixed carrier members 2 and form the movable carrier assemblage M.

Figure 2:
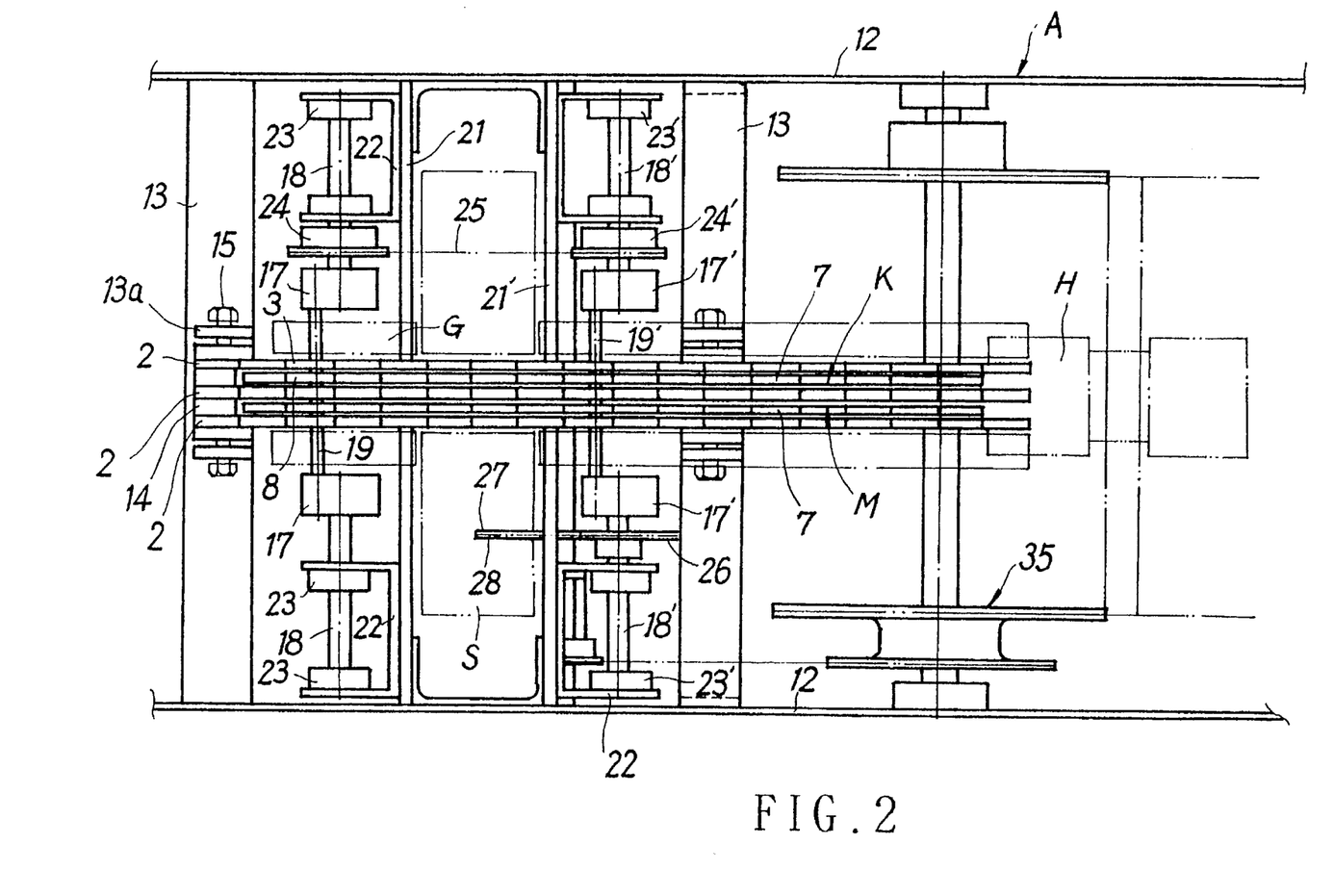
FIG. 2 is a top view of FIG. 1.

Two ends of the first supporting shafts 18 are supported on a pair of first bearings 23 which are laterally symmetrically fixed to two inner side walls of a first U-shaped bracket 22 fixedly attached to a first fixing plate 21 of the feeding machine 1 near the two side walls 12 of the fruit grading machine A, as shown in FIG. 2.

Guide plates G are provided at and extend along two lateral sides of the fixed carrier assemblage K for carrying fruit F. An opening with predetermined length is formed on each guide plate G near a lower or a first end thereof such that two sliding troughs S are separately mounted below the two openings.

A first sprocket gear 24 is mounted at one side of the fixed carrier assemblage K on the first supporting shaft 18 between the cranked round plate 17 and an inner bearing of the first bearing pair 23.

Two ends of the second supporting shafts 18' are supported on a pair of second bearings 23' which are laterally symmetrically fixed to two inner side walls of a second U-shaped bracket 22' fixedly attached to a second fixing plate 21' of the feeding machine 1 near the two side walls 12 of the fruit grading machine A.

A second sprocket gear 24' is mounted at one side of the fixed carrier assemblage K on the second supporting shaft 18' at a position corresponding to the first sprocket gear 24. A first chain 25 is mounted on the first and the second sprocket gears 24, 24' to interconnect them.

A third sprocket gear 26 having a diameter the same as that of the second cranked round plate 17' is mounted at the other side of the fixed carrier assemblage K on the second supporting shaft 18' near the second cranked round plate 17'. A fourth sprocket gear 27 having a diameter larger than that of the third sprocket gear 26 is mounted below the third sprocket gear 26 and is driven by a driving means 35. A second chain 28 is mounted on the third and the fourth sprocket gears 26, 27 to interconnect them.

The fixed carrier assemblage K, the movable carrier assemblage M, and the first and the second sprocket gears 24, 24' for driving the movable carrier assemblage M to move together constitute the automatic fruit feeding machine 1 of the present invention.

Please refer to FIG. 5. When the first eccentric shaft 19 is located at a position lower than the first supporting shaft 18 and the second eccentric shaft 19' is located at a position lower than the second supporting shaft 18', the first or the lowest holding recess 8 of the movable carrier members 7 are in alignment with the second or the next lowest holding recess 3 of the fixed carrier members 2 if viewing sidewardly. When the fourth sprocket gear 27 is driven by the driving means 35 to turn, as shown in FIG. 2, the second chain 28 causes the third sprocket gear 26 to rotate clockwise which in turn causes the coaxial second cranked round plate 17' at the same side as the sprocket gear 26 to rotate in the same direction. Since another second cranked round plate 17' at the other side of the fixed carrier assemblage K is connected to its counterpart by the second eccentric shaft 19', it together with the second sprocket gear 24' are driven to rotate in the same direction. Due to the first chain 25 interconnecting the first and the second sprocket gears 24, 24', the first sprocket gear 24, the first supporting shaft 18, and the first cranked round plate 17 at the same side are driven by the first chain 25 to rotate in the same direction. The first eccentric shaft 19 interconnecting the two first cranked round plates 17 allows the other first cranked round plate 17 to rotate at the same time and in the same direction.

When the second cranked round plates 17' are driven to rotate clockwise by 90 degrees, the first cranked round plates 17 also rotate in the same direction by 90 degrees.

The rotation of the cranked round plates 17, 17' causes the first and the second eccentric shafts 19, 19', respectively, to be simultaneously moved to a position higher than the first and the second supporting shafts 18, 18', respectively. Since the first and the second eccentric shafts 19, 19' respectively extend through the beginning and the end mounting plates 9, 11 of the movable carrier members 7, the displacement of the eccentric shafts 19, 19' causes the movable carrier assemblage M and accordingly the holding recesses 8 thereof to be raised and moved forward to a position higher and in front of the holding recesses 3 of the fixed carrier assemblage K. Thereby, fruit F which are originally located at aligned holding recesses 8 and 3 (as shown by the broken line) are now transferred by the raised holding recesses 8 to a higher place.

Figure 6:
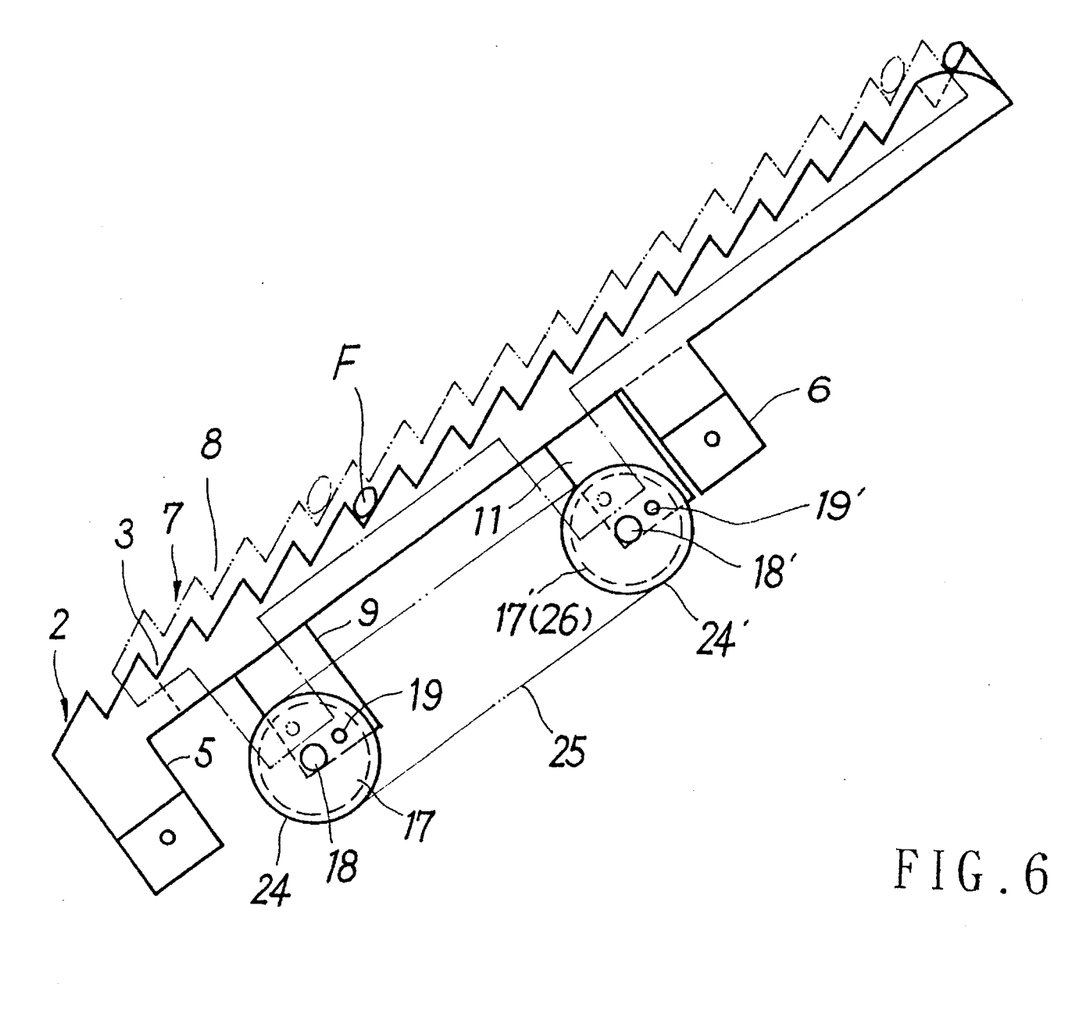
FIG. 6 is a side view showing the movable carrier assemblage of the present invention is driven to lower down from the higher position as shown in FIG. 5 so as to transfer the fruit thereon to a higher position on the fixed carrier assemblage of the present invention.

Please further refer to FIG. 6. When the first and the second cranked round plates 17, 17' are further driven to rotate clockwise by 90 degrees, the first and the second eccentric shafts 19, 19' are moved to a position in front of the first and the second supporting shafts 18, 18', respectively, when viewing sidewardly and in the moving direction of the fruit feeding machine 1. At this point, the movable carrier assemblage M and accordingly, the holding recesses 8 thereof are moved forward again and lowered to be in alignment with the next holding recesses 3 of the fixed carrier assemblage K. Thereby, fruit F which are previously carried by the raised movable carrier assemblage M to a higher place are now transferred to the next higher holding recesses 3 on the fixed carrier assemblage K.

Figure 7:
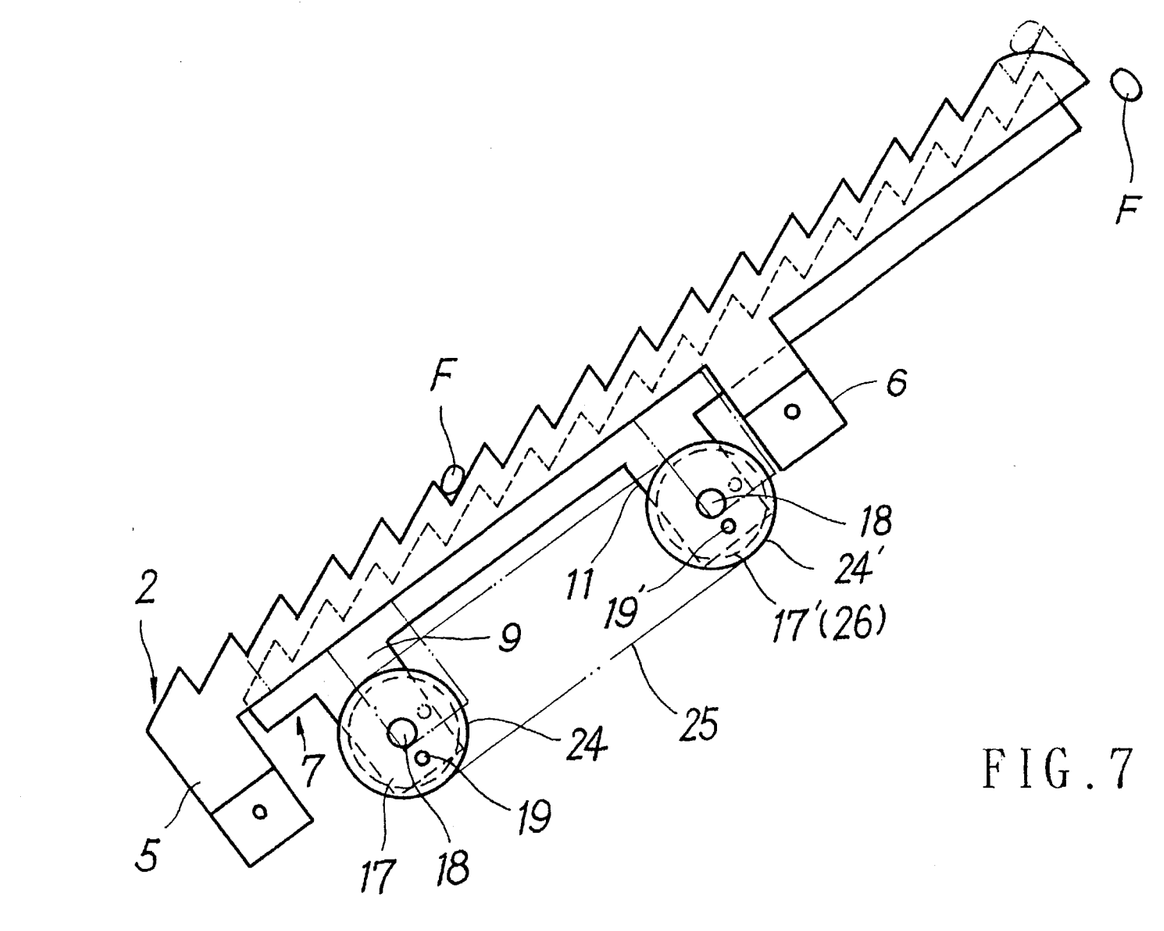
FIG. 7 is a side view similar to FIG. 6 showing the movable carrier assemblage has been lowered from the position as shown in FIG. 6 to a position lower than the fixed carrier assemblage.

Please now refer to FIG. 7. When the cranked round plates 17, 17' are further driven to rotate by another 90 degrees, the eccentric shafts 19, 19' are moved to a position below the supporting shafts 18, 18', respectively. Accordingly, the movable carrier assemblage M is descended and moved backward to be lower than the fixed carrier assamblage K, causing the fruit F to be located on the holding recesses 3 of the fixed carrier assemblage K. Similarly, when the cranked round plates 17, 17' are further rotated clockwise by another 90 degrees, the movable carrier assemblage M is further moved backward and raised again to its original position, that is, the position at where the first holding recess 8 on the movable carrier assemblage M is in alignment with the second holding recess 3 on the fixed carrier assemblage K.

When the cranked round plates 17, 17' are driven to rotate continuously, the movable carrier assemblage M is moved relative to the fixed carrier assemblage K by translation and by circular motion alternately, causing the fruit F to be automatically transferred step by step from a lower holding recess 3 on the fixed carrier assemblage K to a next higher holding recess 3 thereof along a slope formed by the inclinedly disposed fruit feeding machine 1. When the fruit F reaches the highest or the last holding recess 3, it is pushed by the movable carrier assemblage M to pass over the curved end surface 4 of the fixed carrier assemblage K and fall down into a hopper H of the fruit grading machine A disposed below the fruit feeding machine 1.

Figure 8:
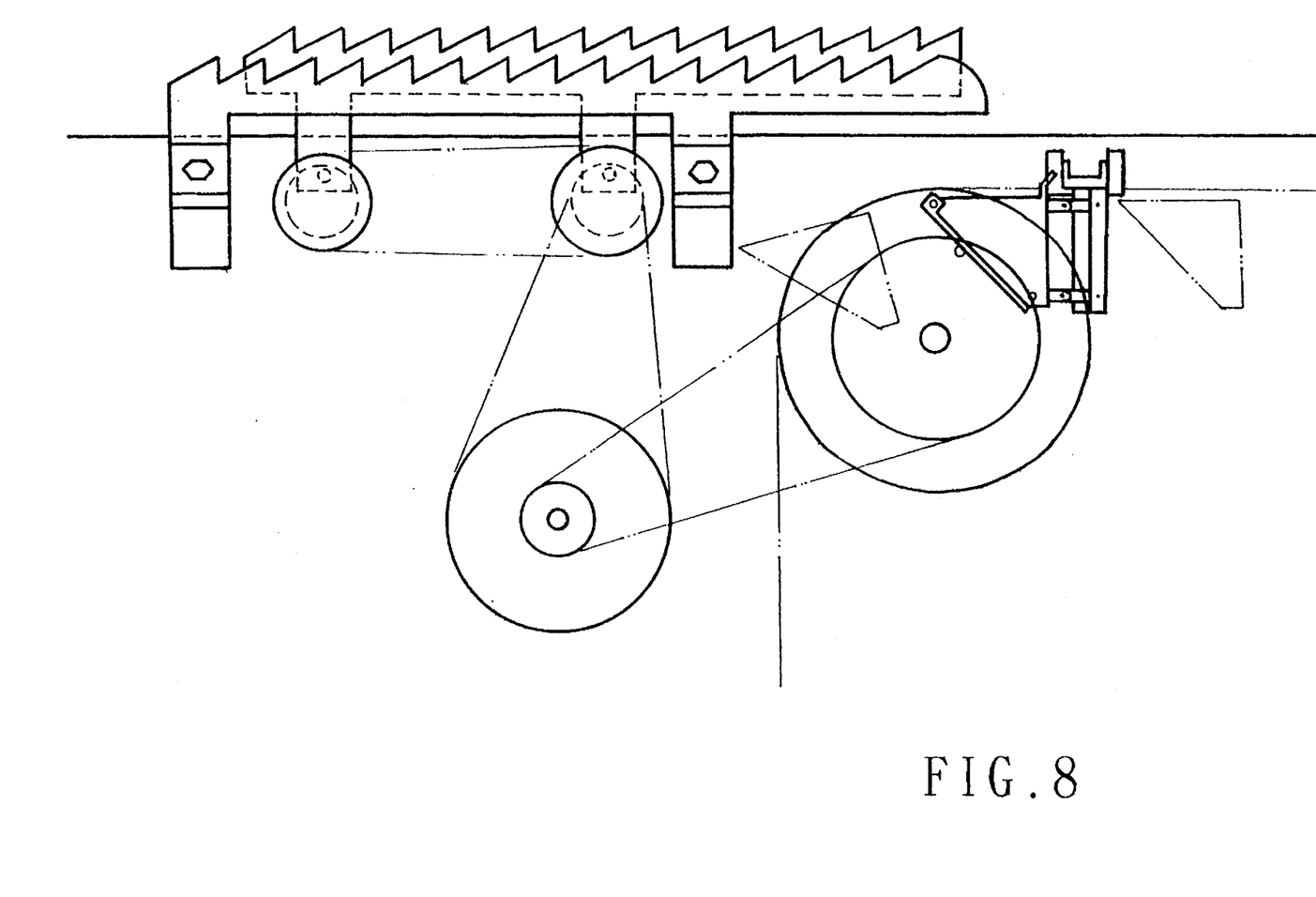
FIG. 8 is a side view showing another embodiment of the automatic fruit feeding machine of the present invention in which the fixed and the movable carrier assemblages are horizontally disposed above a fruit grading machine.

FIG. 8 illustrates another embodiment of the present invention, in which the fixed and the movable assemblages all are similarly structured and arranged except that they are horizontally disposed without forming a slope as in the previously described embodiment. Fruit F are sequentially transferred forward to the fruit grading machine A by means of alternate translation and circular motion of the movable carrier assemblage M relative to the fixed carrier assemblage K.

Figure 9:
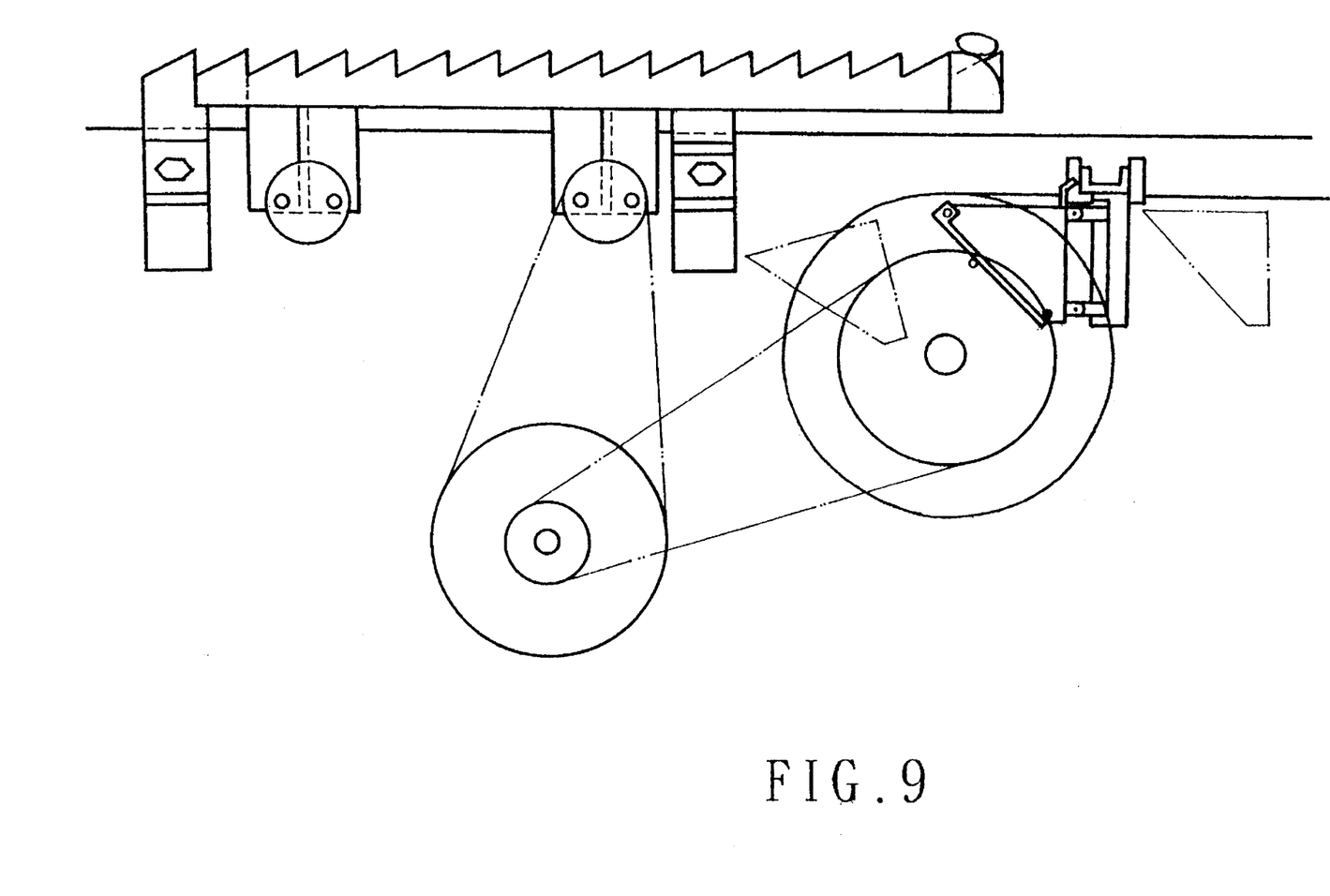
FIG. 9 is a side view similar to FIG. 8 illustrating a third embodiment of the fruit feeding machine in which two sets of movable carrier assemblages are used to be raised and lowered alternately relative to the fixed carrier assemblage to transfer fruit on the feeding machine.

FIG. 9 illustrates a third embodiment of the present invention, in which two sets of movable carrier assemblages M are used while all the other structure and arrangement are similar to that of the first described embodiment. The two sets of movable carrier assemblages M in this embodiment are similarly driven by the driving means 35 to be alternately raised or lowered relative to the fixed carrier assemblage K to automatically transfer fruit F to the fruit grading machine A.

With the above arrangements, the present invention provides an automatic slope or horizontal fruit feeding machine which has simple structure and can accurately feed fruit one by one to an associated fruit grading machine in an economical manner.

The above embodiments are only used for illustration and are not intended to limit the scope of the present invention. Many modifications of these embodiments can be made without departing from the spirit of the present invention.

What is claimed is:

1. An automatic fruit feeding machine for feeding fruit to a fruit grading apparatus comprising:

a) a plurality of stationary, laterally spaced apart, elongated carrier members, each carrier member having an upper surface forming a plurality of holding recesses along its length and an exit end adjacent to the fruit grading apparatus having a convexly curved upper surface to facilitate passage of the fruit from the feeding machine to the fruit grading apparatus;

b) an elongated movable carrier member located between each pair of spaced apart stationary carrier members, each movable carrier member having an upper surface forming a plurality of transferring recesses, and first and second mounting plates extending therefrom;

c) circular crank plates located on each side of the first and second mounting plates;

d) a first shaft eccentrically connected with the circular crank plates on each side of the first mounting plate and to the first mounting plate such that rotation of the circular crank plates causes the longitudinal axis of the first shaft to move in a circular path around a rotational axis of the circular crank plates;

e) a second shaft eccentrically connected with the circular crank plates on each side of the second mounting plate and to the second mounting plate such that rotation of the circular crank plates causes the longitudinal axis of the second shaft to move in a circular path around a rotational axis of the circular crank plates;

f) first endless drive means connecting the circular crank plates on one side of the first and second mounting plates such that the crank plates rotate in unison, such rotation causing the movable carrier to move in a translating circular path whereby fruit in a holding recess of the stationary carrier member is transferred in step-by-step fashion to the exit end from which it enters the fruit grading apparatus;

g) a first sprocket gear drivingly connected to one of the circular crank plates;

h) a second sprocket gear having a diameter larger than that of the first sprocket gear;

i) second endless drive means interconnecting the first and second sprocket gears; and, j) drive means drivingly connected to the second sprocket gear.

\* \* \* \* \*